United States Patent
Lu et al.

(10) Patent No.: US 10,916,140 B2
(45) Date of Patent: Feb. 9, 2021

(54) VEHICLE PARKING SPOT AVAILABILITY PREDICTION BASED ON VEHICLE-TO-ANYTHING ENABLED MACHINE LEARNING

(71) Applicant: TOYOTA JIDOSHA KABUSHIKI KAISHA, Toyota (JP)

(72) Inventors: Hongsheng Lu, Mountain View, CA (US); Gaurav Bansal, Mountain View, CA (US); John Kenney, Mountain View, CA (US)

( * ) Notice: Subject to any disclaimer, the term of this patent is extended or adjusted under 35 U.S.C. 154(b) by 0 days.

(21) Appl. No.: 16/273,458

(22) Filed: Feb. 12, 2019

(65) Prior Publication Data

US 2020/0258386 A1    Aug. 13, 2020

(51) Int. Cl.
| | | |
|---|---|---|
| G08G 1/14 | (2006.01) | |
| G06N 5/04 | (2006.01) | |
| G06Q 50/30 | (2012.01) | |
| G06Q 10/02 | (2012.01) | |

(52) U.S. Cl.
CPC .............. *G08G 1/143* (2013.01); *G06N 5/046* (2013.01); *G06Q 10/02* (2013.01); *G06Q 50/30* (2013.01)

(58) Field of Classification Search
CPC ........ G08G 1/143; G06N 5/046; G06Q 10/02; G06Q 50/30
USPC ..................................................... 340/932.2
See application file for complete search history.

(56) References Cited

U.S. PATENT DOCUMENTS

| | | | | |
|---|---|---|---|---|
| 7,834,778 B2 * | 11/2010 | Browne | ................. | G08G 1/143 340/932.2 |
| 8,843,307 B1 * | 9/2014 | Kolodziej | .......... | G01C 21/3685 340/932.2 |
| 8,972,178 B2 * | 3/2015 | Windeler | ............... | G08G 1/144 701/454 |
| 10,026,042 B2 * | 7/2018 | Dermosessian | ........ | G06Q 10/02 |
| 10,366,610 B2 * | 7/2019 | Ha | ............ | B60R 1/00 |
| 10,457,210 B2 * | 10/2019 | Leem | ................... | G08G 1/0112 |
| 2011/0213672 A1 * | 9/2011 | Redmann | ............. | G06Q 20/209 705/24 |
| 2014/0320318 A1 * | 10/2014 | Victor | ................ | G01C 21/3685 340/932.2 |
| 2016/0019790 A1 * | 1/2016 | Tobolski | ............ | G01C 21/3685 340/932.2 |
| 2016/0371607 A1 * | 12/2016 | Rosen | ................... | G06Q 10/02 |

* cited by examiner

*Primary Examiner* — Eric Blount
(74) *Attorney, Agent, or Firm* — Burbage Law, P.C.; Jon-Michael Burbage; Elizabeth Ruzich

(57) ABSTRACT

The disclosure describes a method for an ego vehicle. The method includes providing roaming data to a server, the roaming data describing a roaming pattern of the ego vehicle in a geographic area as a function of time. The method further includes providing a request to the server that describes a need for the ego vehicle to park. The method further includes receiving, from the server, a geographic location of an available parking spot and an estimated length of time the available parking spot will remain available.

20 Claims, 10 Drawing Sheets

700

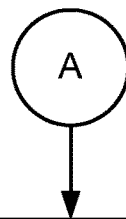

Transmit a response to the ego vehicle that describes a location of the parking spot that is available and the estimate of how long the parking spot will remain available 714

Receive a wireless message from the ego vehicle that describes the parking spot as no longer available 716

Update the list of available parking spots to indicate that the parking spot is no longer available 718

Receive a wireless message from the ego vehicle that describes when the parking spot is again available 720

Update the list of available parking spots to indicate that the parking spot is available 722

Figure 7B

VEHICLE PARKING SPOT AVAILABILITY PREDICTION BASED ON VEHICLE-TO-ANYTHING ENABLED MACHINE LEARNING

BACKGROUND

The specification relates to estimating an availability of a parking spot for a vehicle.

Vehicle drivers and autonomous vehicles struggle to locate parking spots for vehicles. Existing solutions attempt to locate parking spots for vehicles. A problem with these existing solutions, however, is that they are unable to accurately predict how long a parking spot will remain available once it becomes available.

In addition, existing solutions fail to provide enough information for a driver to locate the available parking spot. This is difficult logistically because the driver tries to use a display with information about the parking spot to find the physical location of the parking spot. This also presents a safety problem because if the driver is too focused on a display, the driver may get into more vehicular accidents.

SUMMARY

Described are embodiments of a method for an ego vehicle. The method includes providing roaming data to a server, the roaming data describing a roaming pattern of the ego vehicle in a geographic area as a function of time. The method further includes providing a request to the server that describes a need for the ego vehicle to park. The method further includes receiving, from the server, a geographic location of an available parking spot and an estimated length of time the available parking spot will remain available.

Implementations may include one or more of the following features. The method may further include instructing an autonomous vehicle system of the ego vehicle to automatically park in the available parking spot. The method may further include responsive to the ego vehicle parking in the available parking spot, transmitting a vehicle-to-everything (V2X) message to the server notifying the server that the available parking spot is no longer available. In some embodiments, the available parking spot is determined based on (a) an aggregation of the roaming data from the ego vehicle and roaming data from remote vehicles that are all within the geographic area and (b) an identification of one or more empty parking spots that remain available in the geographic area for one or more lengths of time. In some embodiments, the server uses machine learning and aggregated roaming data to generate historical data that describes historical patterns for one or more lengths of time that one or more empty parking spots remain available and how roaming patterns of the ego vehicle and the remote vehicles correspond to the one or more lengths of time that the one or more empty parking spots remain available. In some embodiments, the ego vehicle sends the request to the server via a Vehicle-to-Anything wireless network or the ego vehicle broadcasts the request using a Basic Safety Message (BSM). The method may further include determining from a travel destination provided by a driver of the ego vehicle that the ego vehicle is within a threshold distance of the travel destination, where providing the request to the server occurs responsive to the ego vehicle being within the threshold distance of the travel destination. The method may further include updating a user interface that includes information about the travel destination to include the geographic location of the available parking spot and the estimated length of time the available parking spot will remain available.

One general aspect includes a system for an ego vehicle, comprising: a processor; and a non-transitory memory storing computer code which, when executed by the processor, causes the processor to: provide roaming data to a server, the roaming data describing a roaming pattern of the ego vehicle in a geographic area as a function of time, provide a request to the server that describes a need for the ego vehicle to park, and receive, from the server, a geographic location of an available parking spot and an estimated length of time the available parking spot will remain available.

Implementations may include one or more of the following features. The system where the computer code, when executed by the processor, further causes the processor to: instruct an autonomous vehicle system of the ego vehicle to automatically park in the available parking spot. The system, where the computer code, when executed by the processor, further causes the processor to: responsive to the ego vehicle parking in the available parking spot, transmit a V2X message to the server notifying the server that the available parking spot is no longer available. In some embodiments, the available parking spot is determined based on (a) an aggregation of the roaming data from the ego vehicle and roaming data from remote vehicles that are all within the geographic area and (b) an identification of one or more empty parking spots that remain available in the geographic area for one or more lengths of time. In some embodiments, the server uses machine learning and aggregated roaming data to generate historical data that describes historical patterns for one or more lengths of time that one or more empty parking spots remain available and how roaming patterns of the ego vehicle and the remote vehicles correspond to the one or more lengths of time that the one or more empty parking spots remain available. In some embodiments, the ego vehicle sends the request to the server via a Vehicle-to-Anything wireless network or the ego vehicle broadcasts the request using a BSM. In some embodiments, the computer code, when executed by the processor, further causes the processor to: determine from a travel destination provided by a driver of the ego vehicle that the ego vehicle is within a threshold distance of the travel destination, where providing the request to the server occurs responsive to the ego vehicle being within the threshold distance of the travel destination. In some embodiments, the computer code, when executed by the processor, further causes the processor to: update a user interface that includes information about the travel destination to include the geographic location of the available parking spot and the estimated length of time the available parking spot will remain available.

One general aspect includes a computer program product comprising a non-transitory memory storing computer-executable code that, when executed by a processor, causes the processor to: provide roaming data to a server, the roaming data describing a roaming pattern of the ego vehicle in a geographic area as a function of time, provide a request to the server that describes a need for the ego vehicle to park, and receive, from the server, a geographic location of an available parking spot and an estimated length of time the available parking spot will remain available.

Implementations may include one or more of the following features. The computer program product, where the computer-executable code further causes the processor to: instruct an autonomous vehicle system of the ego vehicle to automatically park in the available parking spot. The computer program product, where the computer-executable code further causes the processor to: responsive to the ego vehicle parking in the available parking spot, transmit a vehicle-to-everything (V2X) message to the server notifying the server that the available parking spot is no longer available. In some embodiments, the available parking spot is determined based on (a) an aggregation of the roaming data from the ego vehicle and roaming data from remote vehicles that are all within the geographic area and (b) an identification of one or more empty parking spots that remain available in the geographic area for one or more lengths of time.

At least one improvement of the location application described herein over the existing solutions includes that it estimates how long a parking spot will remain available once it becomes available based on a correlation between current and historical roaming patterns of nearby vehicles. The location application notifies drivers and autonomous driving systems of the available parking spot as well as the estimate of how long the parking spot will remain available. The existing systems do not include similar estimates of how long the parking spot will remain available. In embodiments where the vehicle includes the autonomous driving system, the autonomous driving system may automatically park in the available parking spot.

Another improvement of the location application described herein is that for embodiments where a driver drives the vehicle, the location application generates a user interface that helps navigate the driver to the available parking spot. The user interface helps reduce confusion and improves the safety of the vehicle.

BRIEF DESCRIPTION OF THE DRAWINGS

The disclosure is illustrated by way of example, and not by way of limitation in the figures of the accompanying drawings in which like reference numerals are used to refer to similar elements.

FIGS. 7A-7B depict a flowchart of an example method for determining an available parking spot with a time limit according to some embodiments.

DETAILED DESCRIPTION

Figure 1:
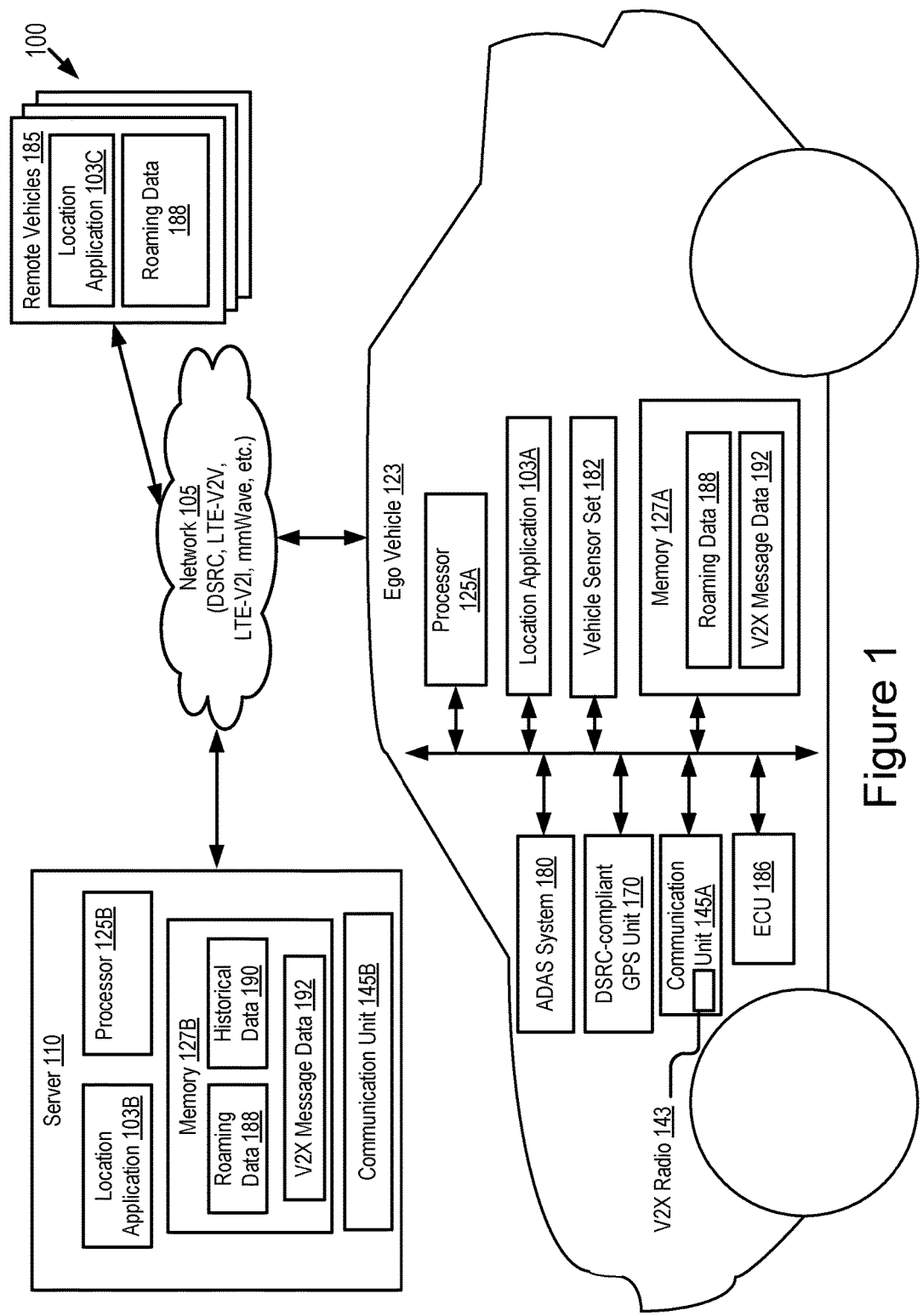
FIG. 1 is a block diagram illustrating an example operating environment for a location application according to some embodiments.

Embodiments of a location application installed in connected vehicles are now described. In some embodiments, an ego vehicle includes a location application that provides roaming data to a server. The roaming data describes a roaming pattern of the ego vehicle in a geographic area as a function of time. The roaming data may also include the roaming pattern of remote vehicles. The ego vehicle may determine the roaming pattern of remote vehicles through vehicle-to-everything (V2X) communications, such as Basic Safety Messages (BSMs). The location application provides a request to the server that describes a need for the ego vehicle to park. The request may also include a current location of the ego vehicle. The location application may receive, from the server, obtain a geographic location of an available parking spot and an estimated length of time the available parking spot will remain open. In some embodiments, the location application instructs an autonomous vehicle system of the ego vehicle to automatically park in the available parking spot or the location application displays a user interface to include the geographic location of the available parking spot and the estimated length of time the available parking spot will remain open.

As described herein, examples of V2X communications include, but are not limited to, one or more of the following: Dedicated Short Range Communication (DSRC) (including BSMs and Personal Safety Messages (PSMs), among other types of DSRC communication); Long-Term Evolution (LTE); millimeter wave (mmWave) communication; 3G; 4G; 5G; LTE-V2X; 5G-V2X; LTE-Vehicle-to-Vehicle (LTE-V2V); LTE-Device-to-Device (LTE-D2D); Voice over LTE (VoLTE); etc. In some examples, the V2X communications can include V2V communications, Vehicle-to-Infrastructure (V2I) communications, Vehicle-to-Network (V2N) communications or any combination thereof.

Examples of a V2X message described herein include, but are not limited to, the following messages: a Dedicated Short Range Communication (DSRC) message; a Basic Safety Message (BSM); a Long-Term Evolution (LTE) message; a LTE-V2X message (e.g., a LTE-Vehicle-to-Vehicle (LTE-V2V) message, a LTE-Vehicle-to-Infrastructure (LTE-V2I) message, an LTE-V2N message, etc.); a 5G-V2X message; and a millimeter wave message, etc.

In some embodiments, a connected vehicle that includes the V2X matching system is a DSRC-equipped vehicle. A DSRC-equipped vehicle is a vehicle which: (1) includes a DSRC radio; (2) includes a DSRC-compliant GPS unit; and (3) is operable to lawfully send and receive DSRC messages in a jurisdiction where the DSRC-equipped vehicle is located. A DSRC radio is hardware that includes a DSRC receiver and a DSRC transmitter. The DSRC radio is operable to wirelessly send and receive DSRC messages. DSRC has a range of substantially 500 meters and is designed to be compatible for wirelessly sending and receiving messages among mobile nodes such as vehicles and RSUs. A DSRC-compliant GPS unit is operable to provide positional information for a vehicle (or some other DSRC-equipped device that includes the DSRC-compliant GPS unit) that has lane-level accuracy.

As used herein, the words "geographic location," "location," "geographic position" and "position" refer to a latitude and longitude of an object (or, a latitude, longitude, and elevation of an object) such as the ride share vehicle. The example embodiments described herein provide positioning information that describes a geographic position of a vehicle with an accuracy of one or more of: (1) at least plus or minus 1.5 meters in relation to the actual geographic position of the vehicle in 2 dimensions including a latitude and a longitude; and (2) at least plus or minus 3 meters in relation to the actual geographic position of the vehicle in an elevation dimension. Accordingly, the example embodiments described herein are able to describe the geographic position of the vehicle with lane-level accuracy or better.

Example Overview

Referring to FIG. 1, depicted is an operating environment 100 for a location application 103 (here, a location application 103A, location application 103B, and a location application 103C may be referred to collectively or individually as the "location application 103" since for example, the location application 103A-103C are different instances of the location application and may provide similar functionality).

The operating environment 100 may include one or more of the following elements: an ego vehicle 123; a server 110; and remote vehicles 185. These elements of the operating environment 100 may be communicatively coupled to a network 105. The server 110 may be DSRC-enabled and may relay wireless messages among the ego vehicle 123 and the remote vehicles 185 via the network 105. In some embodiments, the operating environment 100 may include roadside units (RSUs) (not illustrated) to aid in transmitting communications between the ego vehicle 123 or the remote vehicles 185 and the server 110. For example, the range of DSRC transmissions is generally about 500 meters, and so, if the ego vehicle 123 is 700 meters away from the server 110, then one or more intervening DSRC-enabled roadside units (RSUs) may relay a DSRC message from the ego vehicle 123 to the server 110 or from the server 110 to the ego vehicle 123.

Although one server 110, one ego vehicle 123, and one network 105 are depicted in FIG. 1, in practice the operating environment 100 may include one or more servers 110, one or more ego vehicles 123, and one or more networks 105. Conversely, although multiple remote vehicles 185 are depicted in FIG. 1, in practice the operating environment 100 may include one remote vehicle 185.

The network 105 may be a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices and/or entities may communicate. In some embodiments, the network 105 may include a peer-to-peer network. The network 105 may also be coupled to or may include portions of a telecommunications network for sending data in a variety of different communication protocols. In some embodiments, the network 105 includes Bluetooth® communication networks or a cellular communications network for sending and receiving data including via short messaging service (SMS), multimedia messaging service (MMS), hypertext transfer protocol (HTTP), direct data connection, wireless application protocol (WAP), e-mail, DSRC, full-duplex wireless communication, mmWave, WiFi (infrastructure mode), WiFi (ad-hoc mode), visible light communication, TV white space communication and satellite communication. The network 105 may also include a mobile data network that may include 3G, 4G, LTE, LTE-V2V, LTE-V2I, LTE-V2X, LTE-D2D, VoLTE, 5G-V2X or any other mobile data network or combination of mobile data networks. Further, the network 105 may include one or more IEEE 802.11 wireless networks.

In some embodiments, one or more of the ego vehicle 123 and the remote vehicles 185 are DSRC-equipped devices. The network 105 may include one or more communication channels shared among the server 110, the ego vehicle 123, and the remote vehicle 185. The communication channel may include DSRC, LTE-V2X, full-duplex wireless communication, or any other wireless communication protocol. For example, the network 105 may be used to transmit a DSRC message, a DSRC probe, or a basic safety message (BSM) including any of the data described herein.

The ego vehicle 123 may be any type of vehicle. For example, the ego vehicle 123 may include one of the following types of vehicles: a car; a truck; a sports utility vehicle; a bus; a semi-truck; a drone; or any other roadway-based conveyance.

The ego vehicle 123 is operated by a driver that travels in a geographic area and that needs an available parking spot. The ego vehicle 123 may include one or more of the following elements: a processor 125A; a memory 127A; a communication unit 145A; a DSRC-compliant GPS unit 170; the advanced driver assistance (ADAS) system 180; a vehicle sensor set 182; an electronic control unit (ECU) 186; and the location application 103A. These elements of the ego vehicle 123 may be communicatively coupled to one another via a bus.

In some embodiments, the processor 125A and the memory 127A may be elements of an onboard vehicle computer system. The onboard vehicle computer system may be operable to cause or control the operation of the location application 103A. The onboard vehicle computer system may be operable to access and execute the data stored on the memory 127A to provide the functionality described herein for the location application 103A.

The processor 125A includes an arithmetic logic unit, a microprocessor, a general-purpose controller, or some other processor array to perform computations and provide electronic display signals to a display device. The processor 125A processes data signals and may include various computing architectures including a complex instruction set computer (CISC) architecture, a reduced instruction set computer (RISC) architecture, or an architecture implementing a combination of instruction sets. The ego vehicle 123 may include one or more processors 125A. Other processors, operating systems, sensors, displays, and physical configurations may be possible.

The memory 127A stores instructions or data that may be executed by the processor 125A. The instructions or data may include code for performing the techniques described herein. The memory 127A may be a dynamic random-access memory (DRAM) device, a static random-access memory (SRAM) device, flash memory, or some other memory device. In some embodiments, the memory 127A also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. The ego vehicle 123 may include one or more memories 127A.

The memory 127A of the ego vehicle 123 may store roaming data 188. The roaming data 188 describes the roaming patterns of the ego vehicle 123 in a particular geographic area at a particular time of day. The roaming data 188 may be used to determine how long an empty parking spot remains available in the geographic area at the particular time of day. For example, the roaming data 188 may describe when the ego vehicle 123 leaves the parking spot.

The roaming data 188 may include GPS data that describes a geographic location of the ego vehicle 123, such as a longitude and latitude of the ego vehicle 123. In some embodiments, the vehicle GPS data may be retrieved by the DSRC-compliant GPS unit 170 of the ego vehicle 123 that is operable to provide GPS data describing the geographic location of the ego vehicle 123 with lane-level accuracy. For example, the ego vehicle 123 is traveling in a lane of a roadway. Lane-level accuracy means that the location of the ego vehicle 123 is described by the GPS data so accurately that the lane of travel of the ego vehicle 123 within the roadway may be accurately determined based on the GPS data for this ego vehicle 123 as provided by the DSRC-compliant GPS unit 170.

In some embodiments, the roaming data 188 describes the roaming patterns of remote vehicles 185. For example, the remote vehicles 185 may send V2X messages, such as basic safety messages (BSMs), to the ego vehicle 123 that include the roaming data 188. As described in greater detail below, the location application 103A may aggregate the roaming data 188 associated with the ego vehicle 123 with the roaming data 188 associated with the remote vehicles 185 and use the aggregated roaming data to determine patterns.

The V2X message data 192 may include digital data describing one or more V2X messages. For example, the V2X message data 192 includes one or more of: (1) digital data describing V2X broadcast messages, V2X unicast messages, or a combination thereof received from the server 110 of the rider; (2) digital data describing V2X broadcast messages, V2X unicast messages or a combination thereof generated by the ego vehicle 123; and (3) digital data describing one or more V2X broadcast messages, V2X unicast messages, or a combination thereof generated by a user device of the driver. The V2X messages may include roaming data 188 for the remote vehicles 185.

The communication unit 145A transmits and receives data to and from the network 105 or to another communication channel. In some embodiments, the communication unit 145A may include a DSRC transceiver, a DSRC receiver and other hardware or software necessary to make the ego vehicle 123 a DSRC-enabled device. For example, the communication unit 145A includes a DSRC antenna configured to broadcast DSRC messages via the network. The DSRC antenna may also transmit BSM messages at a fixed interval (e.g., every 0.1 seconds, at a time interval corresponding to a frequency range from 1.6 Hz to 10 Hz, etc.) that is user configurable.

A BSM includes BSM data. The BSM data describes attributes of the vehicle that originally transmitted the BSM message. Vehicles equipped with DSRC may broadcast BSMs at an adjustable rate. In some implementations, the rate may be once every 0.10 seconds. The BSM includes BSM data that describes, among other things, one or more of the following: (1) the path history of the vehicle that transmits the BSM; (2) the speed of the vehicle that transmits the BSM; and (3) the GPS data describing a location of the vehicle that transmits the BSM.

A BSM may include two parts. The two parts may include different BSM data. Part 1 of the BSM data may describe one or more of the following: vehicle position (for example, latitude, longitude, elevation, and positional accuracy all as a function of time); vehicle motion (for example, transmission state, speed, heading, steering wheel angle, acceleration set (4-way), which includes three exes of acceleration plus yaw rate, and brake system status); and vehicle size. Part 2 of the BSM data may include a variable set of data elements drawn from a list of optional elements. For example, part 2 may include path history, path prediction, hard active braking, a traction control system active over 100 milliseconds (or 100 microseconds), an antilock brake system active over 100 milliseconds (or 100 microseconds), a status of lights changed and exterior lights, wipers changed and wiper status, and vehicle type (for fleet vehicles).

In some embodiments, part 1 of the BSM is transmitted at an adjustable rate of about 10 times per second. Part 2 of the BSM contains a variable set of data elements drawn from an extensive list of optional elements. Some of the data elements are selected based on event triggers. For example, anti-locking brake system (ABS) being activated may trigger BSM data relevant to the ABS system of the ego vehicle 123 or the remote vehicle 185. In some embodiments, some of the elements of Part 2 are added to part 1 and sent as part of the BSM message or some of the elements are transmitted less frequently in order to conserve bandwidth. In some implementations, the BSM data included in a BSM includes current snapshots of a vehicle traveling along a roadway system (with the exception of path data, which is itself limited to a few seconds of past history data).

In some embodiments, the communication unit 145A includes a port for direct physical connection to the network 105 or to another communication channel. For example, the communication unit 145A includes a USB, SD, CAT-5, or similar port for wired communication with the network 105. In some embodiments, the communication unit 145A includes a wireless transceiver for exchanging data with the network 105 or other communication channels using one or more wireless communication methods, including: IEEE 802.11; IEEE 802.16, BLUETOOTH®; EN ISO 14906: 2004 Electronic Fee Collection—Application interface EN 11253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); the communication method described in U.S. patent application Ser. No. 14/471,387 filed on Aug. 28, 2014 and entitled "Full-Duplex Coordination System"; or another suitable wireless communication method.

In some embodiments, the communication unit 145A includes a full-duplex coordination system as described in U.S. patent application Ser. No. 14/471,387 filed on Aug. 28, 2014 and entitled "Full-Duplex Coordination System."

In some embodiments, the communication unit 145A includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some embodiments, the communication unit 145A includes a wired port and a wireless transceiver. The communication unit 145A also provides other conventional connections to the network 105 for distribution of files or media objects using standard network protocols including TCP/IP, HTTP, HTTPS, and SMTP, millimeter wave, DSRC, etc.

In some embodiments, the communication unit 145A includes any type of V2X communication antenna that supports one or more of the following V2X communication protocols: DSRC; mmWave; LTE-V2X; LTE-D2D; 5G-V2X; ITS-G5; ITS-Connect; LPWAN; visible light communication; television white space; Bluetooth; Wi-Fi, etc. The communication unit 145A includes a V2X radio 143. In some embodiments, the location application 103A includes code and routines that are operable to control the operation of the V2X radio 143 and cause the V2X radio 143 to transmit a V2X message to the server 110 that includes the roaming data 188 of the ego vehicle 123. In some embodiments, the V2X message sent to the server 110 also includes roaming data 188 of the remote vehicles 185. In some embodiments, the location application 103A is further operable to instruct the V2X radio 143 to receive the V2X messages from the remote vehicles 185. For example, the communication unit 145A may listen to channels of the V2X radio 143 for requests from the remote vehicles 185, where the requests are for information about the availability of parking spots.

The V2X radio 143 is an electronic device that includes a V2X transmitter and a V2X receiver and is operable to send and receive wireless messages via any V2X protocol, including BSMs. For example, the V2X radio 143 is operable to send and receive wireless messages via DSRC. The V2X transmitter is operable to transmit and broadcast DSRC messages over the 5.9 GHz band. The V2X receiver is operable to receive DSRC messages over the 5.9 GHz band. The V2X radio 143 includes multiple channels with at least one of these channels designated for sending and receiving BSMs and at least one of these channels designated for sending and receiving PSMs.

In some embodiments, the DSRC-compliant GPS unit 170 includes any hardware and software necessary to make the ego vehicle 123 or the DSRC-compliant GPS unit 170 compliant with one or more of the following DSRC standards, including any derivative or fork thereof: EN 12253: 2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); and EN 13372:2004 Dedicated Short-Range Communication (DSRC)—DSRC profiles for RTTT applications (review); EN ISO 14906: 2004 Electronic Fee Collection—Application interface.

In some embodiments, the DSRC-compliant GPS unit 170 includes any hardware and software necessary to make the ego vehicle 123 or the DSRC-compliant GPS unit compliant with one or more of the following DSRC standards, including any derivative or fork thereof: IEEE 802.11; IEEE 1609.x (x=2, 3, 4); SAE J2735; SAE J2945.x (x=0, 1, and others), etc. In some embodiments, the DSRC-compliant GPS unit 170 is operable to provide GPS data describing the location of the ego vehicle 123 with lane-level accuracy.

In some embodiments, the DSRC-compliant GPS unit 170 includes hardware that wirelessly communicates with a GPS satellite to retrieve GPS data that describes the geographic location of the ego vehicle 123 with a precision that is compliant with the DSRC standard. The DSRC standard requires that GPS data be precise enough to infer if two vehicles (one of which is, for example, the ego vehicle 123) are located in adjacent lanes of travel. In some embodiments, the DSRC-compliant GPS unit 170 is operable to identify, monitor, and track its two-dimensional position within 1.5 meters of its actual position 68% of the time under an open sky. Since driving lanes are typically no less than 3 meters wide, whenever the two-dimensional error of the GPS data is less than 1.5 meters the location application 103A described herein may analyze the GPS data provided by the DSRC-compliant GPS unit 170 and determine what lane the ego vehicle 123 is traveling in based on the relative positions of two or more different vehicles (one of which is, for example, the ego vehicle 123) traveling on the roadway at the same time.

By comparison to a DSRC-compliant GPS unit 170, a conventional GPS unit which is not compliant with the DSRC standard, is unable to determine the location of a vehicle with lane-level accuracy. For example, a typical roadway lane is approximately 3 meters wide. However, a conventional GPS unit only has an accuracy of plus or minus 10 meters relative to the actual location of the vehicle. As a result, such conventional GPS units are not sufficiently accurate to identify a lane of travel for a vehicle based on GPS data alone; instead, systems having only conventional GPS units must utilize sensors such as cameras to identify the lane of travel of the vehicle. Identifying a lane of travel of a vehicle is beneficial, for example, because in some embodiments it may enable the location application 103A to more accurately identify a location of the ego vehicle 123 traveling in a roadway having multiple lanes of travel.

For example, comparing with a GPS unit of a DSRC-equipped vehicle (conformant to SAE J2945/1, with the 1.5-meter accuracy requirement), a GPS unit of a non-DSRC vehicle which is not compliant with the DSRC standard is unable to determine the location of the vehicle with lane-level accuracy. In another example, comparing the GPS unit to a DSRC-compliant GPS unit 170, a GPS unit of a remote vehicle 185 is also unable to determine the location of the vehicle with lane-level accuracy.

In some embodiments, the ego vehicle 123 may include an autonomous vehicle or a semi-autonomous vehicle. For example, the ego vehicle 123 may include an ADAS 180. In some embodiments, the ADAS system 180 includes any hardware or software that controls one or more operations of the ego vehicle 123 so that the ego vehicle 123 is "autonomous" or "semi-autonomous."

The ADAS system 180 may include one or more advanced driver assistance systems. Examples of the ADAS system 180 may include one or more of the following elements of the ego vehicle 123: an automatic parking system; an adaptive cruise control (ACC) system; an adaptive high beam system; an adaptive light control system; an automotive night vision system; a blind spot monitor; a collision avoidance system; a crosswind stabilization system; a driver drowsiness detection system; a driver monitoring system; an emergency driver assistance system; a forward collision warning system; an intersection assistance system; an intelligent speed adaption system; a lane departure warning system; a pedestrian protection system; a traffic sign recognition system; a turning assistant; and a wrong-way driving warning system.

The vehicle sensor set 182 includes one or more sensors that are operable to measure a roadway environment outside of the ego vehicle 123 and ego vehicle 123 behavior. For example, the vehicle sensor set 182 may include one or more sensors that record one or more physical characteristics of the road environment that is proximate to the ego vehicle 123 and roaming data 188 describing the path history and kinematic information about the ego vehicle 123. The path history and kinematic information may include heading, speed, braking patterns, such as hard braking, etc. The memory 127A may store sensor data that describes the one or more physical characteristics recorded by the vehicle sensor set 182. In some embodiments, the vehicle sensor set 182 stores the roaming data 188 separately from the other sensor data.

In some embodiments, the vehicle sensor set 182 may include one or more of the following vehicle sensors: a camera; a LIDAR sensor; a radar sensor; a laser altimeter; an infrared detector; a motion detector; a thermostat; a sound detector, a carbon monoxide sensor; a carbon dioxide sensor; an oxygen sensor; a mass air flow sensor; an engine coolant temperature sensor; a throttle position sensor; a crank shaft position sensor; an automobile engine sensor; a valve timer; an air-fuel ratio meter; a blind spot meter; a curb feeler; a defect detector; a Hall effect sensor, a manifold absolute pressure sensor; a parking sensor; a radar gun; a speedometer; a speed sensor; a tire-pressure monitoring sensor; a torque sensor; a transmission fluid temperature sensor; a turbine speed sensor (TSS); a variable reluctance sensor; a vehicle speed sensor (VSS); a water sensor; a wheel speed sensor; and any other type of automotive sensor.

The ECU 186 is an embedded system in automotive electronics that controls one or more of electrical systems or subsystems in the ego vehicle 123. Types of the ECU 186 include, but are not limited to, the following: Engine Control Module (ECM); Powertrain Control Module (PCM); Transmission Control Module (TCM); Brake Control Module (BCM or EBCM); Central Control Module (CCM); Central Timing Module (CTM); General Electronic Module (GEM); Body Control Module (BCM); and Suspension Control Module (SCM), etc.

In some embodiments, the ego vehicle 123 may include multiple ECUs 186. In some embodiments, the location application 103A may be an element of the ECU 186 and the ECU executes the methods 400 and 500 described in FIGS. 4 and 5 as determined by the location application 103A.

The remote vehicles 185 may be any type of vehicle. For example, the remote vehicles 185 may include one of the following types of vehicles: a car; a truck; a sports utility vehicle; a bus; a semi-truck; a drone; or any other roadway-based conveyance. The remote vehicles 185 may include a location application 103C and roaming data 188. The location application 103C may generate roaming data 188 using hardware associated with a remote vehicle 185 and transmit the roaming data 188 to the server 110 or the ego vehicle 123 as a V2X message (including basic safety messages (BSMs)).

The server 110 is a computing device that includes one or more processors and one or more memories. The server 110 includes one or more of the following elements: a location application 103B; a processor 125B; a memory 127B; and a communication unit 145B.

The processor 125B, the memory 127B and the communication unit 145B may have a structure similar to that of the processor 125A, the memory 127B, and the communication unit 145A respectively and may provide functionality similar to that of the processor 125A, the memory 127A, and the communication unit 145A respectively. Similar description is not repeated here. The processors 125A-125B, the memories 127A-127B and the communication units 145A-145B may be respectively referred to as "processor 125," "memory 127" and "communication unit 145," individually or collectively.

In some embodiments, the location application 103B includes software that is operable, when executed by the processor 125B, to cause the processor 125B to execute methods 400 and 500 in FIGS. 4 and 5 as described in greater detail below. For example, the location application 103B receives V2X message data 192 that describes V2X messages from one or more of the ego vehicle 123 and the remote vehicle 185, extracts roaming data 188 from the V2X messages, and generates historical data 190 that describes (1) historical patterns for how long parking spots remain available; and (2) how roaming patterns of the ego vehicle 123 and the remote vehicles 185 correlate to the length of time that such parking spots remain available.

The location application 103B may receive a request from the ego vehicle 123 that describes a need for the ego vehicle 123 to park. The request may include a current location of the ego vehicle 123. The location application 103B identifies an available parking spot and an estimate of a length of time that the available parking spot will remain available and transmits the information back to the ego vehicle 123.

In some embodiments, the location application 103B may be implemented using hardware including a field-programmable gate array ("FPGA") or an application-specific integrated circuit ("ASIC"). In some other embodiments, the location application 103B may be implemented using a combination of hardware and software. The location application 103B may be stored in a combination of the devices (e.g., servers or other devices), or in one of the devices.

In some embodiments, if the ego vehicle 123 is an autonomous vehicle, the location application 103A of the ego vehicle 123 receives the available parking stop and the estimate of the length of time that the available parking spot will remain available and automatically parks in the available parking spot.

In some embodiments, if the ego vehicle 123 is not autonomous (e.g., human driven), the location application 103B generates a user interface that includes information about how to navigate to the available parking spot and the estimate of the length of time that the available parking spot will remain available. For example, the location application 103A may determine a travel destination provided by a driver of the ego vehicle 123, determine that the ego vehicle 123 is within a threshold distance of the travel destination, responsive to being within the threshold distance of the travel destination, request that the server 110 provide information about an available parking spot, and responsive to receiving the information from the server 110, update the user interface to include the geographic location of the available parking spot and the estimate of the length of time the available parking spot will remain available.

Example Computer System

Figure 2:
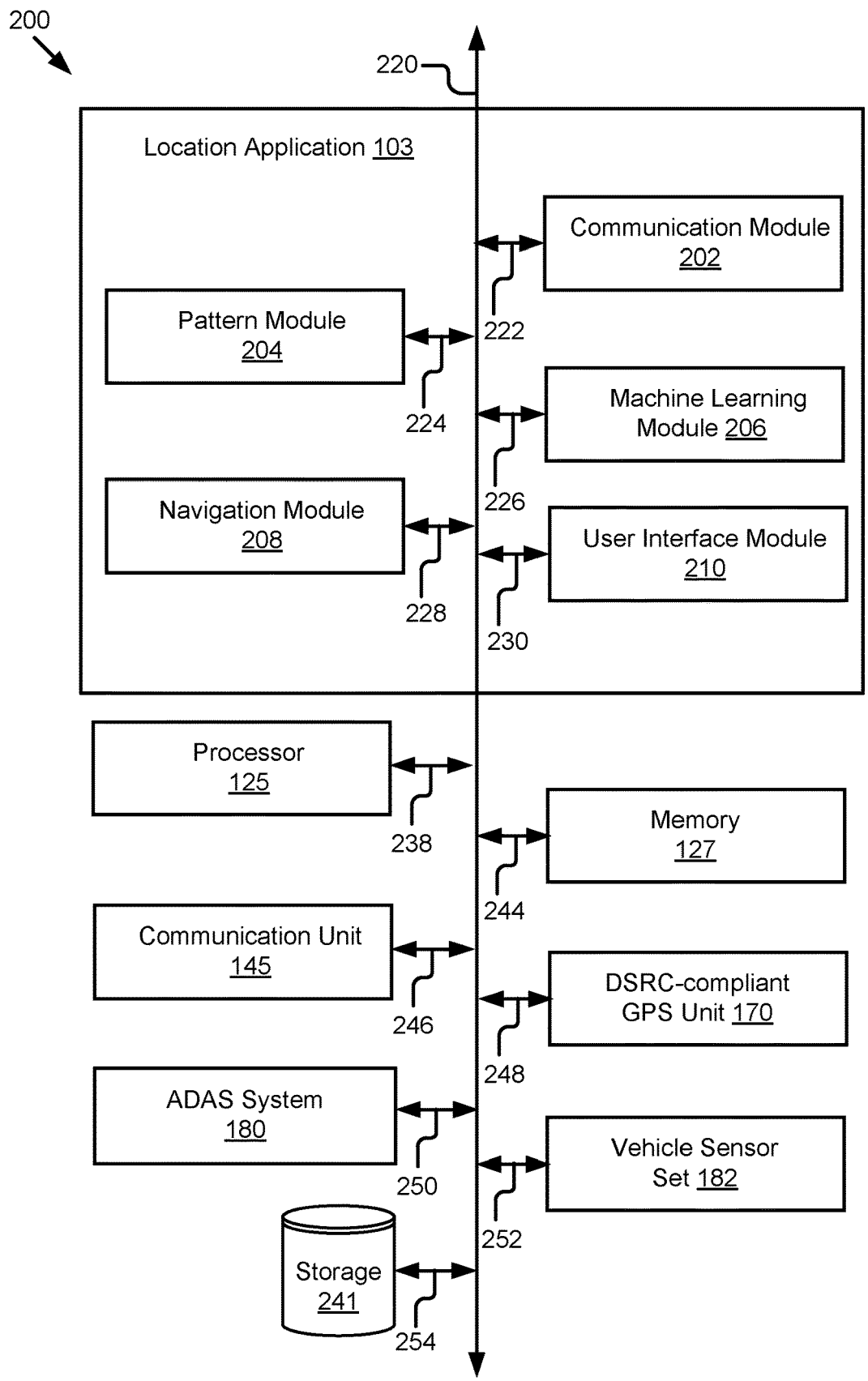
FIG. 2 is a block diagram illustrating an example computer system for a location application according to some embodiments.

Referring now to FIG. 2, depicted is a block diagram illustrating an example computer system 200 including the location application 103 according to some embodiments. In some embodiments, the computer system 200 may include a special-purpose computer system that is programmed to perform one or more steps of methods 400 and 500 described below with reference to FIGS. 4 and 5.

In some embodiments, the computer system 200 may be an element of a first connected device. For example, the first connected device can be the ego vehicle 123 or the server 110. The computer system 200 may be an element of the ego vehicle 123, an element of the server 110, or in part an element of the ego vehicle 123 and in part an element of the server 110.

The computer system 200 may include one or more of the following elements according to some examples: the location application 103; the processor 125; the memory 127; the communication unit 145; the DSRC-compliant GPS unit 170; the ADAS system 180; the vehicle sensor set 182; and a storage 241. The components of the computer system 200 are communicatively coupled by a bus 220. Although the computer system 200 is illustrated having the components of the ego vehicle 123, people of ordinary skill in the art will recognize that components may be added or removed depending on whether the computer system 200 is operating on the ego vehicle 123 or the server 110.

In the illustrated embodiment, the processor 125 is communicatively coupled to the bus 220 via a signal line 238. The memory 127 is communicatively coupled to the bus 220 via a signal line 244. The communication unit 145 is communicatively coupled to the bus 220 via a signal line 246. The DSRC-compliant GPS unit 170 is communicatively coupled to the bus 220 via a signal line 248. The ADAS system 180 is communicatively coupled to the bus 220 via a signal line 250. The vehicle sensor set 182 is communicatively coupled to the bus 220 via a signal line 252. The storage 241 is communicatively coupled to the bus 220 via a signal line 254.

The following elements of the computer system 200 are described above with reference to FIG. 1, and so, those descriptions will not be repeated here: the processor 125; the memory 127; the communication unit 145; the DSRC-compliant GPS unit 170; the ADAS system 180; and the vehicle sensor set 182.

The memory 127 may store any of the data described above with reference to FIG. 1. The memory 127 may store any data necessary for the computer system 200 to provide its functionality.

The storage 241 can be a non-transitory storage medium that stores data for providing the functionality described herein. The storage 241 may be a dynamic random-access memory (DRAM) device, a static random-access memory (SRAM) device, flash memory, or some other memory devices. In some embodiments, the storage 241 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In the illustrated embodiment shown in FIG. 2, the location application 103 includes: a communication module 202; a pattern module 204; a machine learning module 206; a navigation module 208; and a user interface module 210. These components of the location application 103 are communicatively coupled to each other via the bus 220. In some embodiments, components of the location application 103 can be stored in a single server or device. In some other embodiments, components of the location application 103 can be distributed and stored across multiple servers or devices. For example, some of the components of the location application 103 may be distributed across the server 110 and the ego vehicle.

The communication module 202 can be software including routines for handling communications between the location application 103 and other components of the computer system 200. In some embodiments, the communication module 202 can be stored in the memory 127 of the computer system 200 and can be accessible and executable by the processor 125. The communication module 202 may be adapted for cooperation and communication with the processor 125 and other components of the computer system 200 via a signal line 222.

The communication module 202 sends and receives data, via the communication unit 145, to and from one or more elements of the operating environment 100. For example, the communication module 202 receives or transmits, via the communication unit 145, one or more V2X messages including BSMs. The communication module 202 may send or receive any of the data or messages described above with reference to FIG. 1 via the communication unit 145. In another example, where the location application 103 is stored on the ego vehicle 123, the communication module 202 provides roaming data 188 to the server 110, provides a request to the server 110 that describes a need for the ego vehicle 123 to park, and receives, from the server 110, a geographic location of an available parking spot and an estimate of a length of time the available parking spot will remain available.

In some embodiments, the communication module 202 receives data from components of the location application 103 and stores the data in one or more of the storage 241 and the memory 127. For example, the communication module 202 receives any of the data described above with reference to the memory 127 from the communication unit 145 (via the network 105, a DSRC message, a BSM, a DSRC probe, a full-duplex wireless message, etc.) and stores this data in the memory 127 (or temporarily in the storage 241 which may act as a buffer for the computer system 200).

In some embodiments, the communication module 202 may handle communications between components of the location application 103. For example, the communication module 202 may handle communications among the machine learning module 206 and the user interface module 210. Any of these modules may cause the communication module 202 to communicate with the other elements of the computer system 200 or the operating environment 100 (via the communication unit 145).

The pattern module 204 can be software including routines for determining roaming patterns. In some embodiments, the pattern module 204 can be stored in the memory 127 of the computer system 200 and can be accessible and executable by the processor 125. The pattern module 204 may be adapted for cooperation and communication with the processor 125 and other components of the computer system 200 via a signal line 224.

In the following description of FIG. 2, assume that the computer system 200 is an element of the ego vehicle 123. The ego vehicle 123 receives, via the communication unit 145, roaming data 188 generated by the DSRC-compliant GPS unit 170 and the vehicle sensor set 182. The ego vehicle 123 also receives, via the communication unit 145, roaming data 188 that is included in a V2X message, such as a BSM from a remote vehicle 185. The roaming data 188 describes the roaming patterns of the ego vehicle 123 and the remote vehicles 185 in a particular geographic area at a particular time of day. For example, the roaming data 188 describes GPS coordinates of a remote vehicle 185 as a function of time.

The pattern module 204 may aggregate the roaming data 188 from the ego vehicle 123 and the remote vehicles 185. The pattern module 204 determines pattern data based on the roaming data 188 that describes how the roaming data 188 correlates to how long an empty parking spot remains open in the particular geographic area at the particular time of day. In some embodiments, the pattern module 204 instructs the communication unit 145 to transmit the pattern data to the server 110.

The machine learning module 206 can be software including routines for determining an available parking spot and estimating a length of time the available parking spot will remain available. In some embodiments, the machine learning module 206 can be stored in the memory 127 of the computer system 200 and can be accessible and executable by the processor 125. The machine learning module 206 may be adapted for cooperation and communication with the processor 125 and other components of the computer system 200 via a signal line 226. In some embodiments, the machine learning module 206 is a component of the server 110. In some embodiments, the machine learning module 206 is a component of the ego vehicle 123.

The machine learning module 206 determines an available parking spot and estimates a length of time the available parking spot will remain available. In some embodiments, the machine learning module 206 uses aggregated roaming data 188 to generate historical data that describes historical patterns for one or more lengths of time that one or more empty parking spots remain available and how roaming patterns of the ego vehicle 123 and the remote vehicles 185 correspond to the one or more lengths of time that the one or more empty parking spots remain available.

In some embodiments, the machine learning module 206 uses training data to create a trained model that determines the available parking spot and estimates the length of time the available parking spot will remain available. For example, the machine learning module 206 may receive training data that describes the movement of a set of vehicles in a geographic location over a time period and the locations of all parking spots in the geographic location. The machine learning module 206 may compare the movement of the set of vehicles with the location of the parking spots to identify when vehicles in the set of vehicles parked in the parking spots and left the parking spots. The machine learning module 206 uses the training data to determine historical data 190 related to how long the parking spots remain available. For example, the machine learning module 206 may determine that parking spots remain available for short periods of time during business hours, such as 9:00 am to 5:00 pm Monday through Friday, but remain available for longer periods of time outside of business hours Monday through Friday.

In some embodiments, the machine learning module 206 may generate a trained model based on supervised learning, for example, based on a user or an algorithm identifying when a vehicle leaves a parking spot to make the parking spot available and when the vehicle parks in the parking spot to stop the parking spot from being available. The trained model may include a variety of model forms or structures, such as a neural-network (e.g., a linear network), a deep neural network that implements a plurality of layers (e.g., hidden layers between an input layer and an output layer, with each layer being a linear network), a convolutional neural network (e.g., a network that splits or partitions input data into multiple parts or tiles, processes each tile separately using one or more neural-network layers, and aggregates the results from the processing of each tile), a sequence-to-sequence neural network (e.g., a network that takes as input sequential data such as a series of locations of a vehicle, images of a parking lot, etc. and produces as output a result sequence), etc.

The model form or structure may specify connectivity between various nodes and an organization of nodes into layers. For example, nodes of a first layer (e.g., an input layer) may receive roaming data 188 that describes the roaming patterns of the ego vehicle 123 and the remote vehicles 185. Subsequent intermediate layers may receive as input output of nodes of a previous layer per the connectivity specified in the model form or structure. These layers may also be referred to as hidden layers. A final layer (e.g., an output layer) produces an output of the trained model. For example, the output may be historical data 190 that describes historical patterns for one or more lengths of time that one or more empty parking spots remain available and how roaming patterns of the ego vehicle 123 and the remote vehicles 185 correspond to the one or more lengths of time that the one or more empty parking spots remain available.

In some embodiments where the machine learning module 206 is stored on the server 110, the machine learning module 206 receives a request from the ego vehicle 123 that describes a need for the ego vehicle 123 to park. For example, the request may include a current location of the ego vehicle 123. The request may also include roaming data 188 describing the roaming patterns of remote vehicles 185 in the geographic area. The machine learning module 206 may use the historical data 190 generated by the trained model to determine one or more available parking spots and estimate a length of time each of the one or more available parking spots will remain available. The machine learning module 206 may instruct the communication unit 145B to send a broadcast or unicast, for each available parking spot, that describes the geographic location of the available parking spot and an estimate of how long the parking spot will remain available.

In some embodiments, the trained model may be refined through feedback. For example, the machine learning module 206 may receive notifications from the ego vehicle 123 and remote vehicles 185 when the ego vehicle 123 and the remote vehicles 185 take a parking spot and leave a parking spot. As a result of the feedback from the ego vehicle 123 and the remote vehicles 185, the machine learning module 206 may keep track of the availability of different parking spots. In addition, the machine learning module 206 may determine from the feedback new information about how long parking spots are available before they are taken. As a result, the machine learning module 206 may update the trained model with the feedback about the length of time of availability of the parking spots.

The navigation module 208 can be software including routines for generating a request that describes a need for the ego vehicle 123 to park. In some embodiments, the navigation module 208 can be stored in the memory 127 of the computer system 200 and can be accessible and executable by the processor 125. The navigation module 208 may be adapted for cooperation and communication with the processor 125 and other components of the computer system 200 via a signal line 228.

The navigation module 208 may provide navigation services to a driver of the ego vehicle 123. For example, the driver may input a travel destination into a user interface generated by the user interface module 210. The navigation module 208 may generate driving directions that the user interface displays to help navigate the user to the travel destination. In some embodiments, the navigation module 208 may determine the travel destination based on historical travel data. For example, the navigation module 208 may determine that the driver is going to work based on driving to work starting at 8:45 every Monday through Friday.

In some embodiments, the navigation module 208 may determine that the ego vehicle 123 is within a threshold distance of the travel destination and, responsive to determining that the ego vehicle 123 is within the threshold distance, generate a request that describes a need for the ego vehicle to park. In embodiments where the machine learning module 206 is stored on the ego vehicle 123, the navigation module 208 may instruct the communication unit 145 to transmit the request to the machine learning module 206 on the ego vehicle 123. In embodiments where the machine learning module 206 is stored on the server 110, the navigation module 208 may instruct the communication unit 145 to transmit a request to the machine learning module 206 on the server 110 using V2X, including a BSM.

The navigation module 208 receives the geographic location of an available parking spot and an estimate of a length of time from the machine learning module 206. In embodiments where the ego vehicle 123 includes an ADAS system 180, the navigation module 208 instructs the ADAS system 180 via the communication unit 145 to automatically park in the available parking spot. In embodiments where the ego vehicle 123 does not include the ADAS system 180, the navigation module 208 instructs the user interface module 210 to update the user interface to include the geographic location of the available parking spot and an estimated length of time the available parking spot will remain available.

The navigation module 208 may continue to send instructions to the user interface module 210 to update the user interface to help guide the driver to find the available parking spot. In some embodiments, the computer system 200 includes speakers and the navigation module 208 instructs the speakers to provide additional instructions to help the driver find the available parking spot. This advantageously improves the safety of the ego vehicle 123 by preventing the driver from having to stare at a user interface that fails to help the driver locate the available parking spot.

In some embodiments, when the ego vehicle 123 parks in the available parking spot, the navigation module 208 instructs the communication unit 145 to notify the server 110 that the parking spot is no longer available. For example, the communication unit 145 sends a V2X message, such as a BSM. When the ego vehicle 123 leaks the parking spot, the navigation module 208 may instruct the communication unit 145 to notify the server 110 that the parking spot is an available parking spot again.

The user interface module 210 can be software including routines for generating a user interface. In some embodiments, the user interface module 210 can be stored in the memory 127 of the computer system 200 and can be accessible and executable by the processor 125. The user interface module 210 may be adapted for cooperation and communication with the processor 125 and other components of the computer system 200 via a signal line 230.

The user interface module 210 generates graphical data for displaying a user interface on a display. The display may be hardware that is part of the ego vehicle 123, such as a touchscreen display that is located in the center console, a heads-up display unit, or any other type of display that is inside the ego vehicle 123. The display may also be part of a mobile device that is associated with a user, such as the driver or a passenger of the ego vehicle 123.

Figure 3:
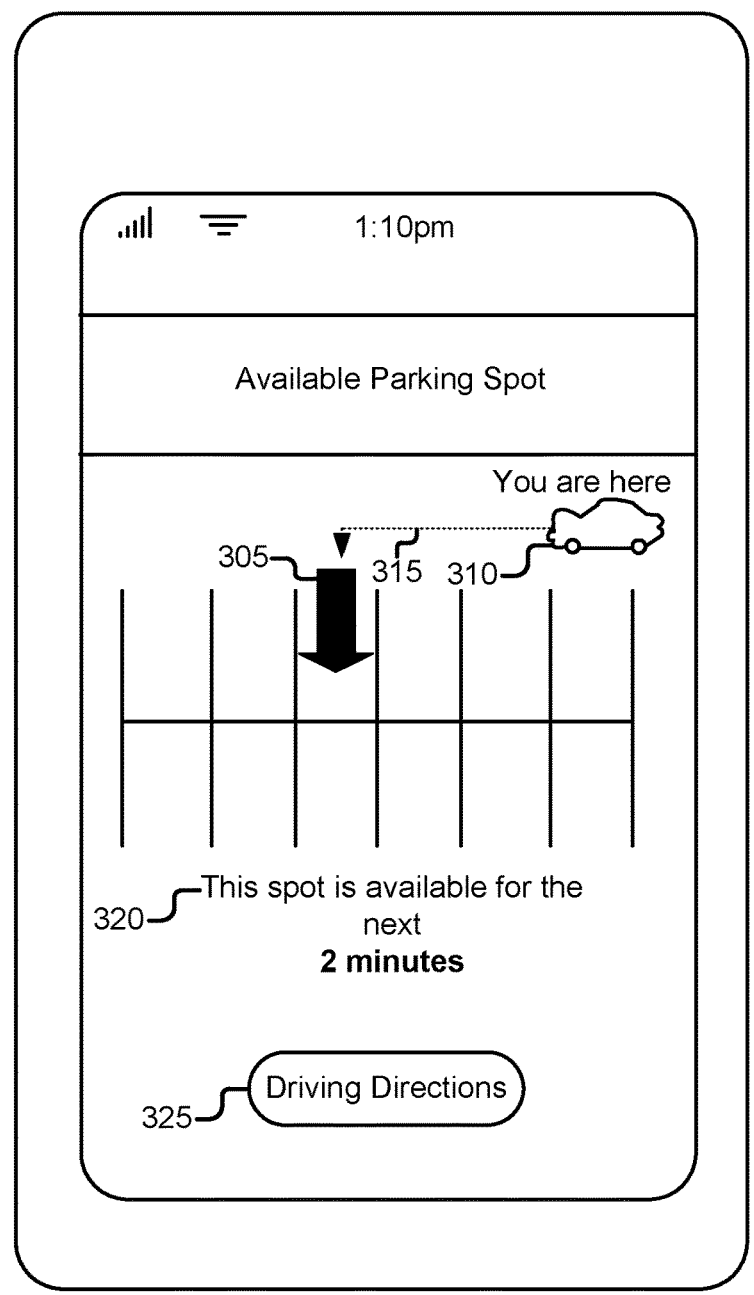
FIG. 3 is an example user interface illustrating an available parking spot with an estimated length of availability according to some embodiments.

Turning to FIG. 3, an example user interface 300 of an available parking spot with an estimated length of availability is illustrated. In this example, the user interface module 210 generated graphical data to display an available parking spot as indicated by the solid arrow 305. The user interface also includes an icon 310 of the driver's car with the following indicator "You are here" and a dashed arrow 315 that traces a path from the current location of the car to the available parking spot. The user interface 300 also includes the estimated length of availability. Specifically, the user interface 300 includes an indicator 320 that "This spot is available for the next 2 minutes." Lastly, the user interface 300 includes a selectable button 325 for returning to a "Driving Directions" page that displays information about navigating from an initial destination to the travel destination.

The user interface module 210 may update the user interface as the ego vehicle 123 moves to show how the ego vehicle 123 is moving relative to the available parking spot. The user interface module 210 may also update the estimated length of availability as time passes. For example, the estimated length of availability may decrease per second and once the estimated length of availability falls below a threshold time (such as 30 seconds) the estimated length of availability may change to indicate that a change is imminent, such as by changing from black to red text.

Example Processes

Figure 4:
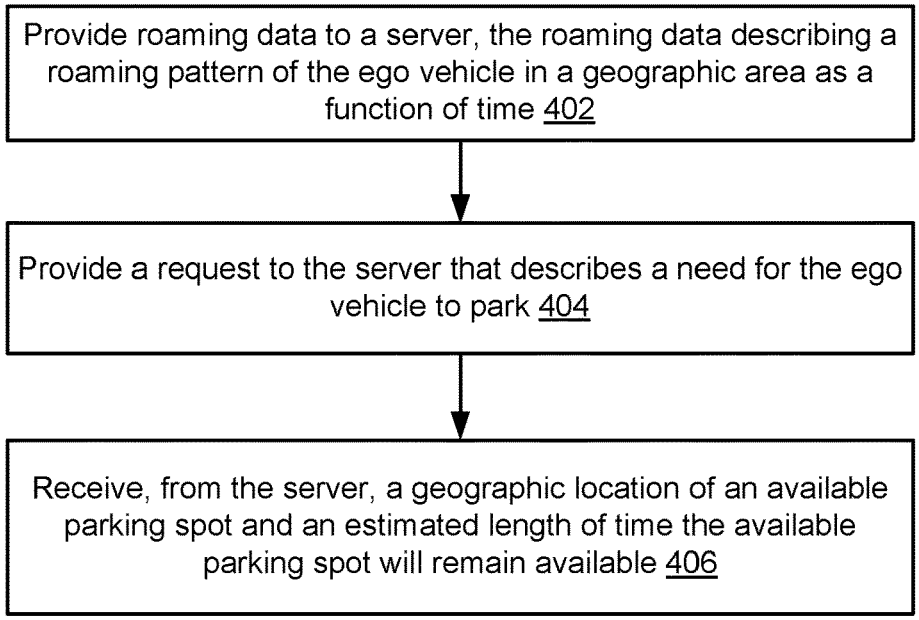
FIG. 4 depicts a flowchart of an example method for determining an available parking spot with a time limit according to some embodiments.

Referring now to FIG. 4, depicted is a flowchart of an example method 400 for determining an available parking spot with a time limit according to some embodiments. The steps of the method 400 are executable in any order, and not necessarily the order depicted in FIG. 4. The method 400 is performed by the location application 103A stored on the ego vehicle 123.

At step 402, roaming data 188 is provided to a server 110. The roaming data 188 describes a roaming pattern of the ego vehicle in a geographic area as a function of time. The roaming data 188 may be provided via a V2X message, such as a BSM.

At step 404, a request is provided to the server 110 that describes a need for the ego vehicle 123 to park. The request may include a current geographic location of the ego vehicle 123. In some embodiments, the request also includes roaming data 188 of remote vehicles 185 that transmitted the roaming data 188 to the ego vehicle 123.

At step 406, a geographic location of an available parking spot and an estimated length of time the available parking spot will remain available is received from the server 110. The location application 103A may instruct an ADAS system 180 of the ego vehicle 123 to automatically park in the available parking spot or generate a user interface that includes the geographic location of the available parking spot and the estimate of the length of time the available parking spot will remain available.

Figure 5:
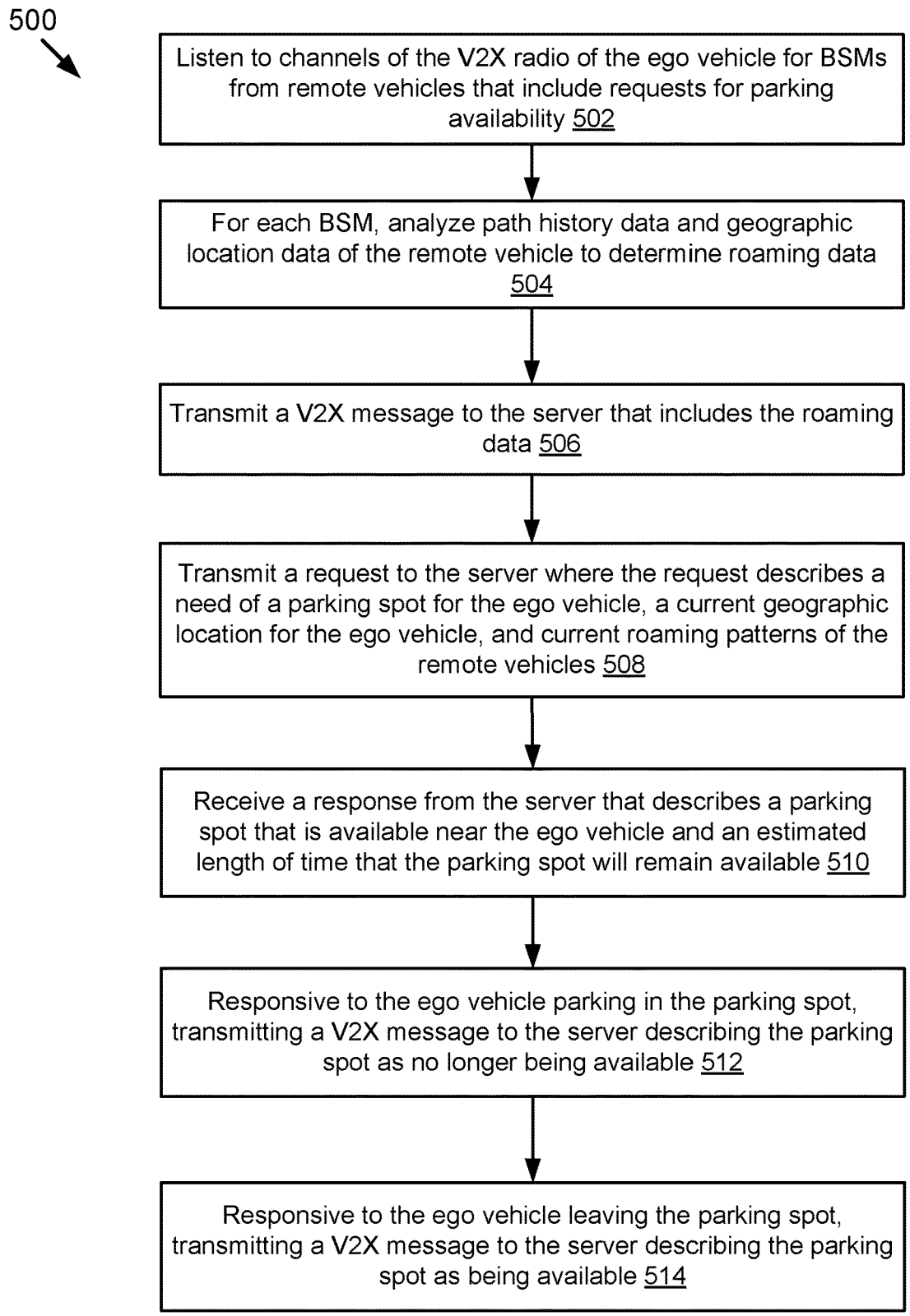
FIG. 5 depicts a flowchart of another example method for determining the available parking spot with a time limit according to some embodiments.

Referring now to FIG. 5, depicted is a flowchart of another example method 500 for determining the available parking spot with a time limit according to some embodiments. The steps of the method 500 are executable in any order, and not necessarily the order depicted in FIG. 5. The method 500 is performed by the location application 103A stored on the ego vehicle 123, the location application 103B stored on the server 110, or in part by the location application 103A stored on the ego vehicle 123 and in part by the location application 103B stored on the server 110.

At step 502, the communication unit 145A listens to channels of the V2X radio 143 of the ego vehicle 123 for BSMs from remote vehicles 185 that include requests for parking availability. Multiple remote vehicles 185 may be looking for a parking space at the same time.

At step 504, for each BSM, path history data and the geographic location data (such as GPS data) is analyzed to determine roaming data 188. In some embodiments, the roaming data 188 may include any information describing any available parking spaces observed by the vehicle sensor set 182 of the ego vehicle 123 and the geographic locations of these parking spaces. At step 506, a V2X message is transmitted to the server 110 including the roaming data 188.

At step 508, a request is transmitted to the server 110 where the request describes a need of a parking spot for the ego vehicle 123, a current geographic location for the ego vehicle 123, and current roaming patterns of the remote vehicles 185. The request may be triggered by a determination that the ego vehicle 123 needs a parking spot. The determination may be based, for example, on driver input, a decision of the ADAS system, or a determination that the ego vehicle 123 is within a threshold distance of a travel destination. The ego vehicle 123 may broadcast the request to the remote vehicles 185 and unicast the request to the remote vehicles 185.

At step 510, a response is received from the server 110 that describes a parking spot that is available near the ego vehicle 123 and an estimated length of time that the parking spot will remain available. In some embodiments, the location application 103A determines based on the estimated length of time, whether the parking spot will be available long enough for the ego vehicle to reach it before another vehicle parks in the parking spot. In other embodiments, the server 110 only provides information about a parking spot that is available if the server 110 determines is it reachable by the ego vehicle 123 within the estimated length of time that the parking spot will remain available.

Responsive to the ego vehicle 123 parking in the parking spot, a V2X message is transmitted to the server 110 describing the parking spot as no longer being available. Responsive to the ego vehicle 123 leaving the parking spot, transmitting a V2X message to the server 110 describing the parking spot as being available.

Figure 6:
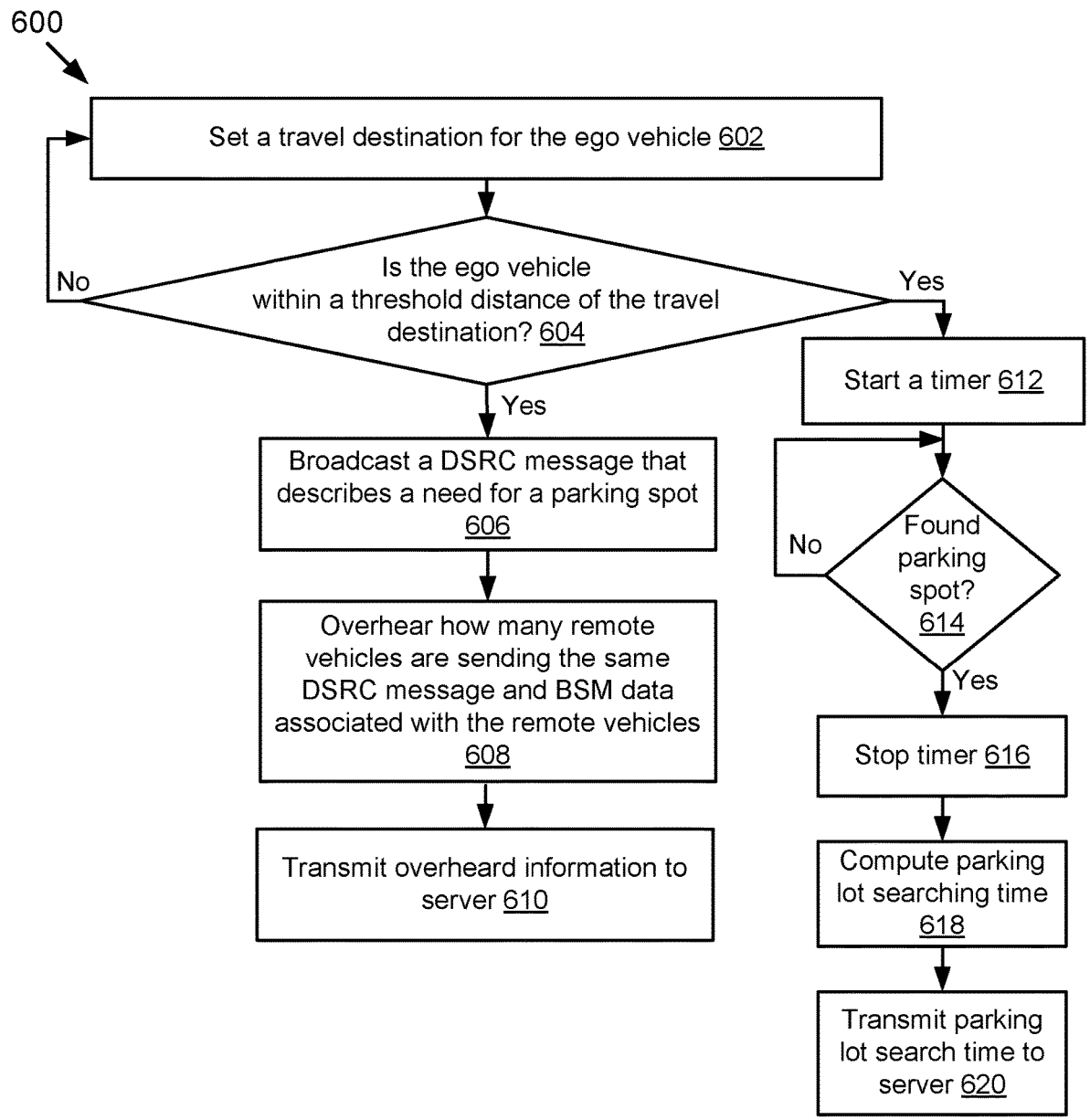
FIG. 6 depicts a flowchart of an example method for obtaining an available parking spot based on proximity to the available parking spot and timing

FIG. 6 depicts a flowchart of an example method 600 for obtaining an available parking spot based on proximity to the available parking spot and timing. The steps of the method 600 are executable in any order, and not necessarily the order depicted in FIG. 6. The method 600 is performed by the location application 103A stored on the ego vehicle 123.

At step 602, a travel destination is set for the ego vehicle 123. For example, the driver inputs a travel destination into a navigation system. In some embodiments, the location application 103A may determine the travel destination based on historical travel data. For example, the location application 103A may determine that the driver is going to work based on driving to work starting at 8:45 every Monday through Friday.

At step 604, it is determined whether the ego vehicle 123 is within a threshold distance of the travel destination. If the ego vehicle 123 is not within the threshold distance of the travel destination, the method 600 keeps performing step 604 periodically (e.g., every second, every five seconds, every minute, etc.) until the ego vehicle 123 is within the threshold distance of the travel destination. If the ego vehicle 123 is within the threshold distance of the travel destination, the method 400 performs both steps 606-610 and steps 612-620.

At step 606, a DSRC message is broadcast that describes a need for a parking spot. At step 608, it is overheard how many remote vehicles are sending the same DSRC message and BSM data associated with the remote vehicles. The BSM data describes, for example, path history, positions, speed, etc. At step 610, overheard information is transmitted to the server 110.

At step 612, a time is started. It is determined whether the parking spot has been found. If the parking spot has not been found, the method 600 keeps performing step 614 periodically (e.g., every second, every five seconds, every minute, etc.) until the parking spot is found. Once the parking spot is found, at step 616 the time is stopped. At step 618 a parking lot searching time is computed. At step 620, the parking lot search time is transmitted to the server 110.

Figure 7A:
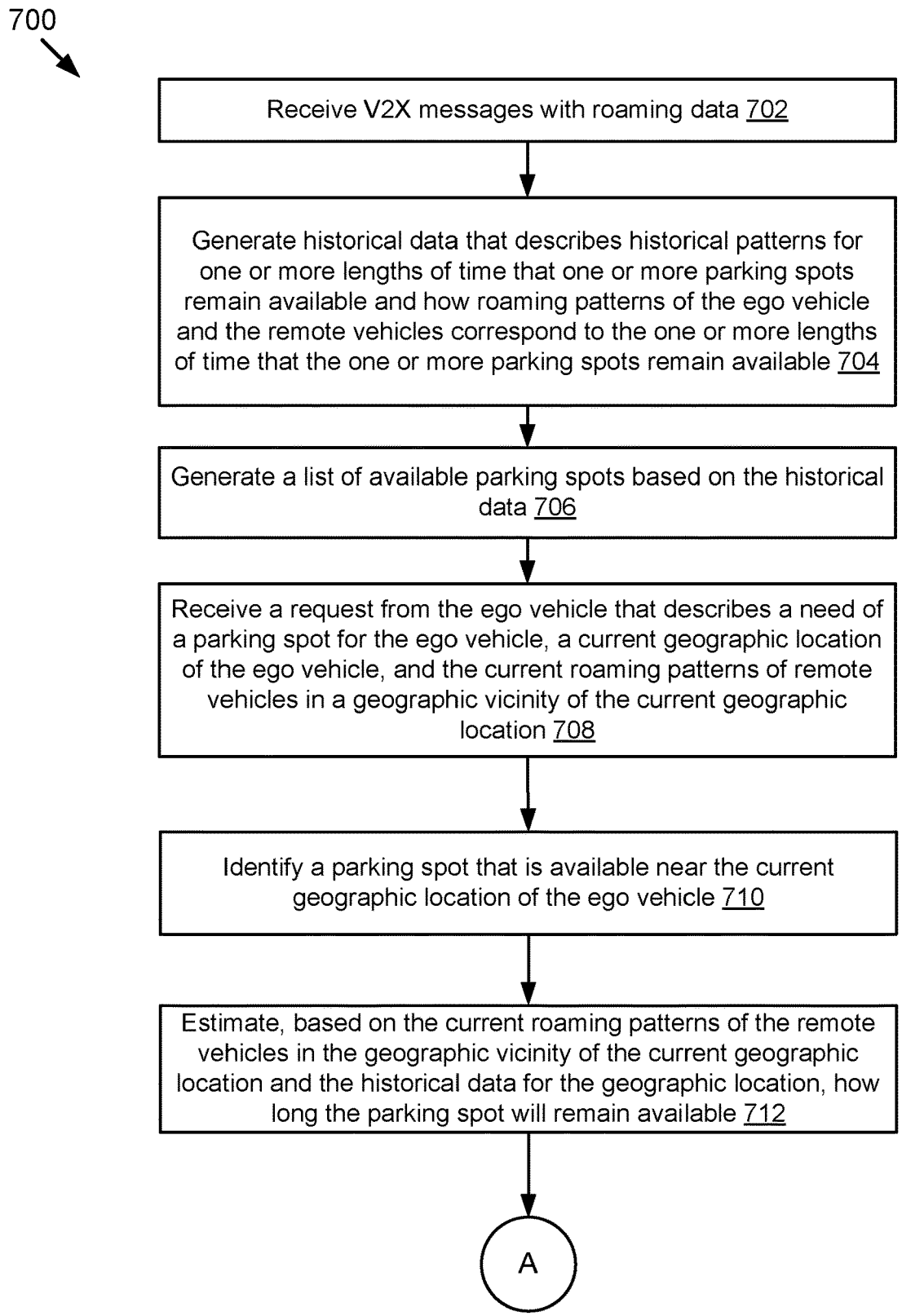

FIGS. 7A-7B depict a flowchart of an example method 700 for determining an available parking spot with a time limit according to some embodiments. The steps of the method 700 are executable in any order, and not necessarily the order depicted in FIG. 7. The method 700 is performed by the location application 103B stored on the server 110.

At step 702, V2X messages with roaming data 188 are received. The V2X messages may be received from the ego vehicle 123 and remote vehicles 185 or the V2X messages from the ego vehicle 123 may include roaming data 188 that aggregates roaming data 188 from the remote vehicles 185.

At step 704, historical data 190 is generated that describes historical patterns for one or more lengths of time that one or more parking spots remain available and how roaming patterns of the ego vehicle 123 and the remote vehicles 185 correspond to the one or more lengths of time that the one or more parking spots remain available. At step 706, a list of available parking spots is generated based on the historical data.

At step 708, a request is received from the ego vehicle 123 that describes a need of a parking spot for the ego vehicle 123, a current geographic location of the ego vehicle 123, and the current roaming patterns of remote vehicles 185 in a geographic vicinity of the current geographic location. At step 710, a parking spot is identified that is available near the current geographic location of the ego vehicle 123. At step 712, it is estimated, based on the current roaming patterns of the remote vehicles 185 in the geographic vicinity of the current geographic location and the historical data for the geographic location, how long the parking spot will remain available.

At step 714, a response to the ego vehicle 123 is transmitted that describes a location of the parking spot that is available and the estimate of how long the parking spot will remain available. At step 716, a wireless message is received from the ego vehicle 123 that describes the parking spot as no longer available. The wireless message may include a V2X message, such as a BSM. At step 718, the list of available parking spots is updated to indicate that the parking spot is no longer available. At step 720, a wireless message is received from the ego vehicle 123 that describes when the parking spot is again available. At step 722, the list of available parking spots is updated to indicate that the parking spot is available.

Figure 8A:
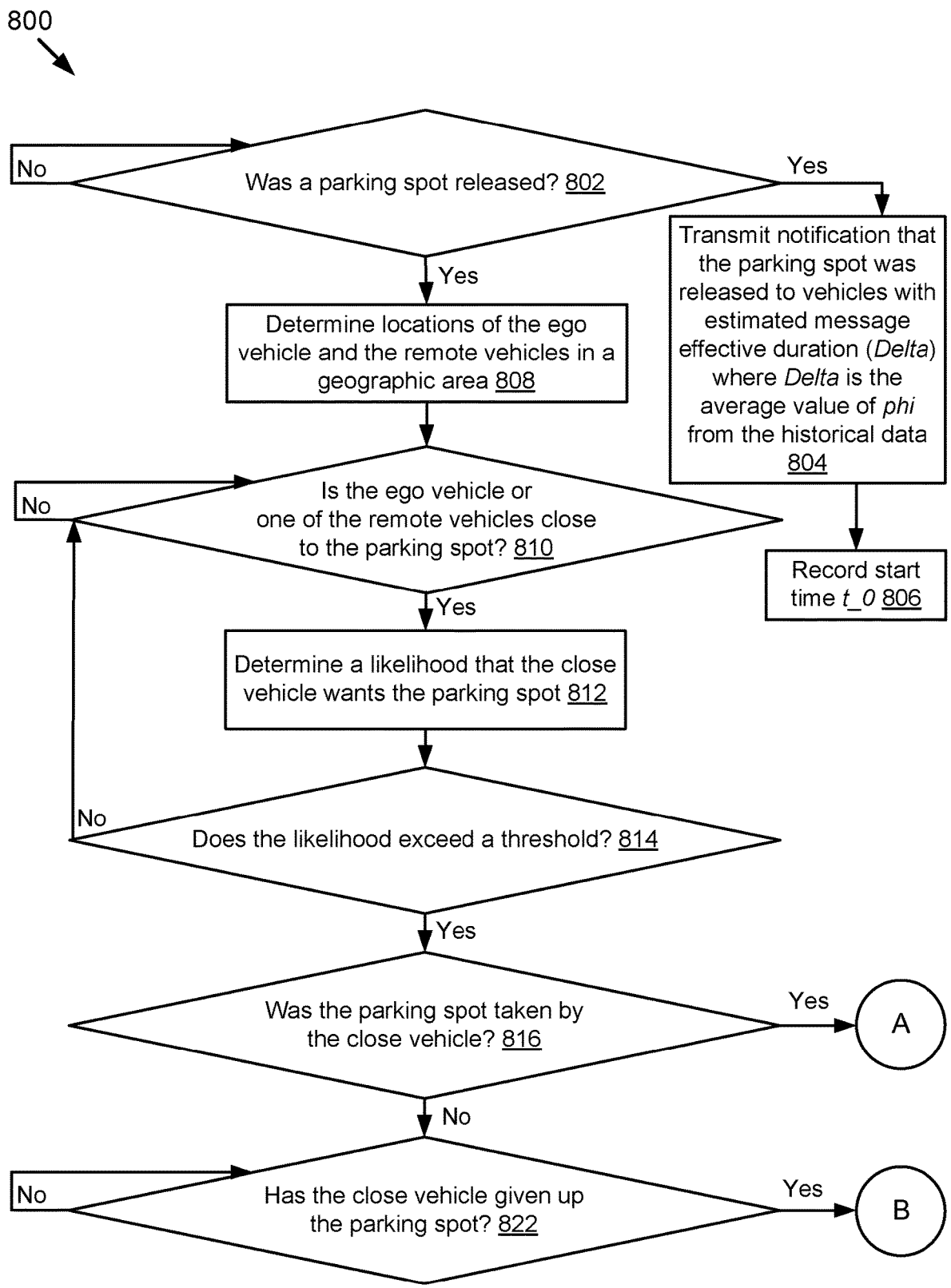
FIGS. 8A-8B depict a flowchart of an example method for notifying drivers about the availability of a parking spot according to some embodiments.
Figure 8B:
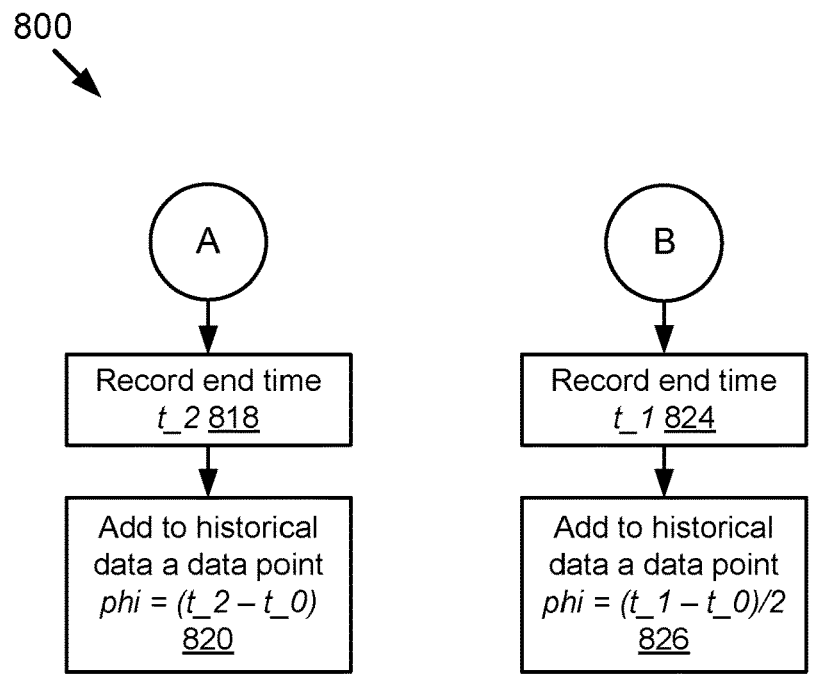

FIGS. 8A-8B depict a flowchart of an example method 800 for notifying drivers about the availability of a parking spot according to some embodiments. The steps of the method 800 are executable in any order, and not necessarily the order depicted in FIG. 8. The method 800 is performed by the location application 103B stored on the server 110.

At step 802, it is determined whether a parking spot was released. If the parking spot was not released, the method 800 continues to determine step 802 periodically (e.g., every second, every five seconds, every minute, etc.) until it is determined that the parking spot was released. If the parking spot was released, both steps 804 and 808 occur. At step 804, a notification is transmitted that the parking spot was released to vehicles with estimated effective duration (Delta) where Delta is the average value pf phi from the historical data 190. For example, Delta=average (phi).

In some embodiments, phi is a best estimation of a duration of time during which a parking spot is considered available. In some embodiments, the historical data 190 includes digital data that describes times when the parking spot is considered available. In other words, the historical data 190 describes a plurality of durations of time (phi) when the parking spot was considered available (e.g., because the parking space was not occupied by a vehicle). The historical data 190 is analyzed to determine Delta by calculating an average of the plurality of instances of phi.

In some embodiments, each instance of phi describes a duration of time when a parking space was not occupied by a vehicle, and thus considered available, during a particular time period and Delta describes an average duration of time when this particular parking space is considered available during this particular time period.

In some embodiments, phi is determined by using different Delta distributions for different times of the day and different locations, and then computing the average value of the corresponding distribution; phi is then equal to this corresponding distribution.

At step 806, the start time is recorded as t_0. At step 808, locations of the ego vehicle 123 and the remote vehicles 185 in a geographic area are determined.

At step 810, it is determined whether the ego vehicle 123 or one of the remote vehicles 185 is close to the parking spot. If the ego vehicle 123 or one of the remote vehicles 185 is not close to the parking spot, step 810 occurs periodically until the ego vehicle 123 or one of the remote vehicles 185 is close to the parking spot. If the ego vehicle 123 or one of the remote vehicles 185 is close to the parking spot, the method 800 proceeds to step 812. At step 812, a likelihood that the close vehicle wants the parking spot is determined. At step 814, it is determined whether the likelihood exceeds the threshold. For example, if the close vehicle is close to a travel destination for the close vehicle, the likelihood exceeds the threshold.

If the likelihood fails to exceed the threshold, the method 800 proceeds to step 810. If the likelihood exceeds the threshold, the method 800 proceeds to step 816. At step 816 it is determined whether the parking spot was taken by the close vehicle. If the parking spot was taken by the close vehicle, at step 818, the end time t_2 is recorded. At step 820, a data point phi=(t_2−t_0) is added to the historical data 190.

If the parking spot was not taken by the close vehicle, at step 822 it is determined whether the close vehicle gave up the parking spot. If the close vehicle did not give up the parking spot, the method 800 repeats step 822 periodically until the close vehicle gives up the parking spot. If the close vehicle gives up the parking spot, the method 800 proceeds to step 824. At step 824, the end time t_1 is recorded. At step 826, a data point phi=(t−1−t_0)/2 is added to the historical data 190.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the present embodiments can be described above primarily with reference to user interfaces and particular hardware. However, the present embodiments can apply to any type of computer system that can receive data and commands, and any peripheral devices providing services.

Reference in the specification to "some embodiments" or "some instances" means that a particular feature, structure, or characteristic described in connection with the embodiments or instances can be included in at least one embodiment of the description. The appearances of the phrase "in some embodiments" in various places in the specification are not necessarily all referring to the same embodiments.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present embodiments of the specification can also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some preferred embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited, to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks.

Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A method for an ego vehicle, the method comprising:
providing roaming data to a server, the roaming data describing a roaming pattern of the ego vehicle in a geographic area as a function of time;
providing a request to the server that describes a need for the ego vehicle to park; and
receiving, from the server, a geographic location of a particular available parking spot and an estimated length of time the particular available parking spot will remain available, wherein the particular available parking spot is determined based on (a) an aggregation of the roaming data from the ego vehicle and roaming data from remote vehicles that are all within the geographic area and (b) an identification of one or more particular empty parking spots that remain available in the geographic area for one or more lengths of time.

2. The method of claim 1, further comprising:
instructing an autonomous vehicle system of the ego vehicle to automatically park in the particular available parking spot.

3. The method of claim 2, further comprising:
responsive to the ego vehicle parking in the particular available parking spot, transmitting a vehicle-to-everything (V2X) message to the server notifying the server that the particular available parking spot is no longer available.

4. The method of claim 1, wherein the server uses the roaming data to determine pattern data that describes how the roaming data correlates to how long the particular available parking spot remains open in the geographic area at a particular time of day.

5. The method of claim 1, wherein the server uses machine learning and aggregated roaming data to generate historical data that describes historical patterns for one or more lengths of time that one or more particular empty parking spots remain available and how roaming patterns of the ego vehicle and the remote vehicles correspond to the one or more lengths of time that the one or more particular empty parking spots remain available.

6. The method of claim 1, wherein the ego vehicle sends the request to the server via a Vehicle-to-Anything wireless network or the ego vehicle broadcasts the request using a Basic Safety Message (BSM).

7. The method of claim 1, further comprising:
determining from a travel destination provided by a driver of the ego vehicle that the ego vehicle is within a threshold distance of the travel destination;
wherein providing the request to the server occurs responsive to the ego vehicle being within the threshold distance of the travel destination.

8. The method of claim 7, further comprising:
updating a user interface that includes information about the travel destination to include the geographic location of the particular available parking spot and the estimated length of time the particular available parking spot will remain available.

9. A system for an ego vehicle, comprising:
a processor; and
a non-transitory memory storing computer code which, when executed by the processor, causes the processor to:
provide roaming data to a server, the roaming data describing a roaming pattern of the ego vehicle in a geographic area as a function of time;
provide a request to the server that describes a need for the ego vehicle to park; and
receive, from the server, a geographic location of a particular available parking spot and an estimated length of time the particular available parking spot will remain available, wherein the particular available parking spot is determined based on (a) an aggregation of the roaming data from the ego vehicle and roaming data from remote vehicles that are all within the geographic area and (b) an identification of one or more particular empty parking spots that remain available in the geographic area for one or more lengths of time.

10. The system of claim 9, wherein the computer code, when executed by the processor, further causes the processor to:
instruct an autonomous vehicle system of the ego vehicle to automatically park in the particular available parking spot.

11. The system of claim 10, wherein the computer code, when executed by the processor, further causes the processor to:
    responsive to the ego vehicle parking in the particular available parking spot, transmit a V2X message to the server notifying the server that the particular available parking spot is no longer available.

12. The system of claim 9, wherein the ego vehicle sends the request to the server via a Vehicle-to-Anything (V2X) wireless network or the ego vehicle broadcasts the request using a Basic Safety Message (BSM).

13. The system of claim 9, wherein the server uses machine learning and aggregated roaming data to generate historical data that describes historical patterns for one or more lengths of time that one or more particular empty parking spots remain available and how roaming patterns of the ego vehicle and the remote vehicles correspond to the one or more lengths of time that the one or more particular empty parking spots remain available.

14. The system of claim 12, wherein the server uses the roaming data to determine pattern data that describes how the roaming data correlates to how long the particular available parking spot remains open in the geographic area at a particular time of day.

15. The system of claim 9, wherein the computer code, when executed by the processor, further causes the processor to:
    determine from a travel destination provided by a driver of the ego vehicle that the ego vehicle is within a threshold distance of the travel destination;
    wherein providing the request to the server occurs responsive to the ego vehicle being within the threshold distance of the travel destination.

16. The system of claim 15, wherein the computer code, when executed by the processor, further causes the processor to:
    update a user interface that includes information about the travel destination to include the geographic location of the particular available parking spot and the estimated length of time the particular available parking spot will remain available.

17. A computer program product comprising a non-transitory memory storing computer-executable code that, when executed by a processor, causes the processor to:
    provide roaming data to a server, the roaming data describing a roaming pattern of an ego vehicle in a geographic area as a function of time;
    provide a request to the server that describes a need for the ego vehicle to park; and
    receive, from the server, a geographic location of a particular available parking spot and an estimated length of time the particular available parking spot will remain available, wherein the particular available parking spot is determined based on (a) an aggregation of the roaming data from the ego vehicle and roaming data from remote vehicles that are all within the geographic area and (b) an identification of one or more particular empty parking spots that remain available in the geographic area for one or more lengths of time.

18. The computer program product of claim 17, wherein the computer-executable code further causes the processor to:
    instructing an autonomous vehicle system of the ego vehicle to automatically park in the particular available parking spot.

19. The computer program product of claim 18, wherein the computer-executable code further causes the processor to:
    responsive to the ego vehicle parking in the particular available parking spot, transmit a vehicle-to-everything (V2X) message to the server notifying the server that the particular available parking spot is no longer available.

20. The computer program product of claim 17, wherein the server uses the roaming data to determine pattern data that describes how the roaming data correlates to how long the particular available parking spot remains open in the geographic area at a particular time of day.

* * * * *